(12) United States Patent
Zhang et al.

(10) Patent No.: US 12,006,672 B2
(45) Date of Patent: Jun. 11, 2024

(54) AUTOMATIC FAUCET FOR WASH BASIN

(71) Applicant: Xiamen Forbetter Sanitary Ware Co., Ltd., Fujian (CN)

(72) Inventors: Xingui Zhang, Xiamen (CN); Yihui Chen, Xiamen (CN); Mouyong Lin, Xiamen (CN)

(*) Notice: Subject to any disclaimer, the term of this patent is extended or adjusted under 35 U.S.C. 154(b) by 151 days.

(21) Appl. No.: 17/938,905

(22) Filed: Sep. 6, 2022

(65) Prior Publication Data

US 2024/0076860 A1    Mar. 7, 2024

(51) Int. Cl.
    *E03C 1/05*      (2006.01)
    *F16K 11/00*     (2006.01)
    *F16K 31/06*     (2006.01)
    *F16K 31/60*     (2006.01)

(52) U.S. Cl.
    CPC .............. *E03C 1/057* (2013.01); *E03C 1/055* (2013.01); *F16K 19/006* (2013.01); *F16K 31/0603* (2013.01); *F16K 31/602* (2013.01); *Y10T 137/9464* (2015.04)

(58) Field of Classification Search
    CPC ........ E03C 1/057; E03C 1/055; F16K 19/006; F16K 31/0603; F16K 31/602; Y10T 137/9464
    USPC ..................................... 137/801; 251/129.03
    See application file for complete search history.

(56) References Cited

U.S. PATENT DOCUMENTS

| | | | | |
|---|---|---|---|---|
| 4,735,357 A * | 4/1988 | Gregory | ................. | E03C 1/057 251/367 |
| 5,412,816 A * | 5/1995 | Paterson | ................. | E03C 1/057 4/623 |
| 7,624,757 B2 * | 12/2009 | Schmitt | ................... | F16K 31/05 236/12.12 |
| 2012/0248351 A1 * | 10/2012 | Huang | ................. | F16K 27/045 251/129.01 |
| 2013/0139920 A1 * | 6/2013 | Wang | ....................... | E03C 1/04 137/801 |
| 2019/0309869 A1 * | 10/2019 | Bakker | ................. | F16K 31/602 |
| 2021/0123220 A1 * | 4/2021 | Yan | ......................... | E03B 7/072 |

\* cited by examiner

*Primary Examiner* — John Bastianelli (57) ABSTRACT

An automatic faucet for a wash basin includes a control box. The control box includes a control box body, a solenoid valve, and a manual control member. Both the solenoid valve and the manual control member can control whether water flows out from a mixed water outlet of the control box body or not. The automatic faucet can realize a manually-operated spray function for use in an emergency when the solenoid valve fails.

11 Claims, 8 Drawing Sheets

AUTOMATIC FAUCET FOR WASH BASIN

BACKGROUND OF THE INVENTION

1. Field of the Invention

The present invention relates to kitchen and toilet faucets, and more particularly to an automatic faucet for a wash basin.

2. Description of the Prior Art

The faucets for wash basins on the market mainly include double-handle faucets and single-handle faucets. The double-handle faucets are favored by users because the hot and cold water switches of the faucets are disposed independently and the temperature adjustment operation is more accurate and easy.

In order to further enhance the convenience of double-handle faucets for wash basins, some double-handle faucets are equipped with sensors and control boxes to realize a sensor-operated spray function. The sensor is configured to sense the user's operation. The control box controls opening and closing of the waterway according to the signal of the sensor, so as to realize the sensor-operated spray function. For example, Chinese Utility Model Publication No. CN201420210325.8 discloses a double-handle basin faucet with a sensor-operated spray function. However, this double-handle basin faucet has a problem, that is, when the solenoid valve of the control box fails due to power failure or mechanical failure, the waterway cannot be opened. At this time, the user cannot manually open the waterway of the faucet for use.

SUMMARY OF THE INVENTION

The primary object of the present invention is to provide an automatic faucet for a wash basin, which can realize a manually-operated spray function for use in an emergency.

In order to achieve the above object, the present invention adopts the following solutions.

An automatic faucet for a wash basin comprises a cold water valve, a hot water valve, a spout, a sensor, and a control box. The control box includes a control box body, a solenoid valve, and a manual control member. The control box body has a cold water inlet, a hot water inlet, a water-mixing chamber, and a mixed water outlet. The water-mixing chamber communicates with the cold water inlet and the hot water inlet. The water-mixing chamber communicates with the mixed water outlet via a sensor control water passage. The water-mixing chamber further communicates with the mixed water outlet via a manual control water passage. The solenoid valve is mounted in the control box body and controls opening and closing of the sensor control water passage. The manual control member is movably fitted to the control box body and controls opening and closing of the manual control water passage. An outlet end of the cold water valve is connected to the cold water inlet of the control box through a cold water pipe. An outlet end of the hot water valve is connected to the hot water inlet of the control box through a hot water pipe. An inlet end of the spout is connected to the mixed water outlet of the control box through a water discharge pipe. The sensor is mounted on the spout and is electrically connected to the solenoid valve of the control box.

Preferably, the manual control member includes a sealing head extending into the manual control water passage. The sealing head is configured to control opening and closing of the manual control water passage.

Preferably, the manual control water passage includes a manual control inlet and a manual control outlet to communicate with the water-mixing chamber and the mixed water outlet, respectively. The manual control inlet communicates with the manual control outlet. The manual control inlet has a diameter greater than that of the manual control outlet. A stepped surface is formed at a junction of the manual control inlet and the manual control outlet. The manual control member is movably inserted through the manual control inlet and the manual control outlet. The sealing head of the manual control member is movable to block the junction of the manual control inlet and the manual control outlet to control opening and closing of the manual control water passage.

Preferably, the sealing head has a stop edge that is movable to lean against the stepped surface.

Preferably, the control box body has an internal thread portion, and the manual control member has an external thread portion to be threadedly connected to the internal thread portion.

Preferably, a side wall of the control box body is formed with a mounting hole communicating with the manual control inlet. The mounting hole is fitted with a mounting head in a sealing manner. The mounting head has the internal thread portion. The internal thread portion is a threaded countersunk hole.

Preferably, the control box body further has a channel communicating with the mixed water outlet. The channel passes through a side wall of the control box body. The channel is opposite to the manual control water passage. The channel and the manual control outlet are located at both sides of the mixed water outlet. The manual control member includes an operating head that is movably inserted in the channel. The operating head is connected to the sealing head through a connecting rod passing through the mixed water outlet. The operating head is fitted to the channel in a sealing manner.

Preferably, the sensor control water passage includes a sensor control inlet, a sensor control outlet, and a sensor control water chamber communicating with the sensor control inlet and the sensor control outlet. The sensor control inlet communicates with the water-mixing chamber. The sensor control outlet communicates with the mixed water outlet. The sensor control water chamber has a fitting hole. The solenoid valve closes the fitting hole. The solenoid valve has a valve head extending into the sensor control water chamber to movably block a junction of the sensor control water chamber and the sensor control outlet.

Preferably, the control box body includes a main body and a base connected to the main body. The main body has the cold water inlet, the hot water inlet, the water-mixing chamber, the mixed water outlet, and the manual control water passage. The base has the sensor control water passage. The solenoid valve is connected to the base.

Preferably, the control box body includes a protective sleeve fitted onto the solenoid valve.

Preferably, a moving direction of the manual control member is perpendicular to the cold water inlet and the hot water inlet.

With the above-mentioned solutions, the manual control member of the control box of the present invention can control opening and closing of the manual control water passage to control whether water is output from the mixed water outlet. The user operates the manual control member to control opening and closing of the manual control water passage and further to control whether the water-mixing chamber communicates with the mixed water outlet or not, so as to control the spout to spray water or not to spray water. In this way, the user can open the manual control water passage when the solenoid valve fails. Then, the manually-operated spray function is realized through the switch control of the cold water valve and the hot water valve for use in an emergency.

DETAILED DESCRIPTION OF THE PREFERRED EMBODIMENTS

Embodiments of the present invention will now be described, by way of example only, with reference to the accompanying drawings.

Figure 1:
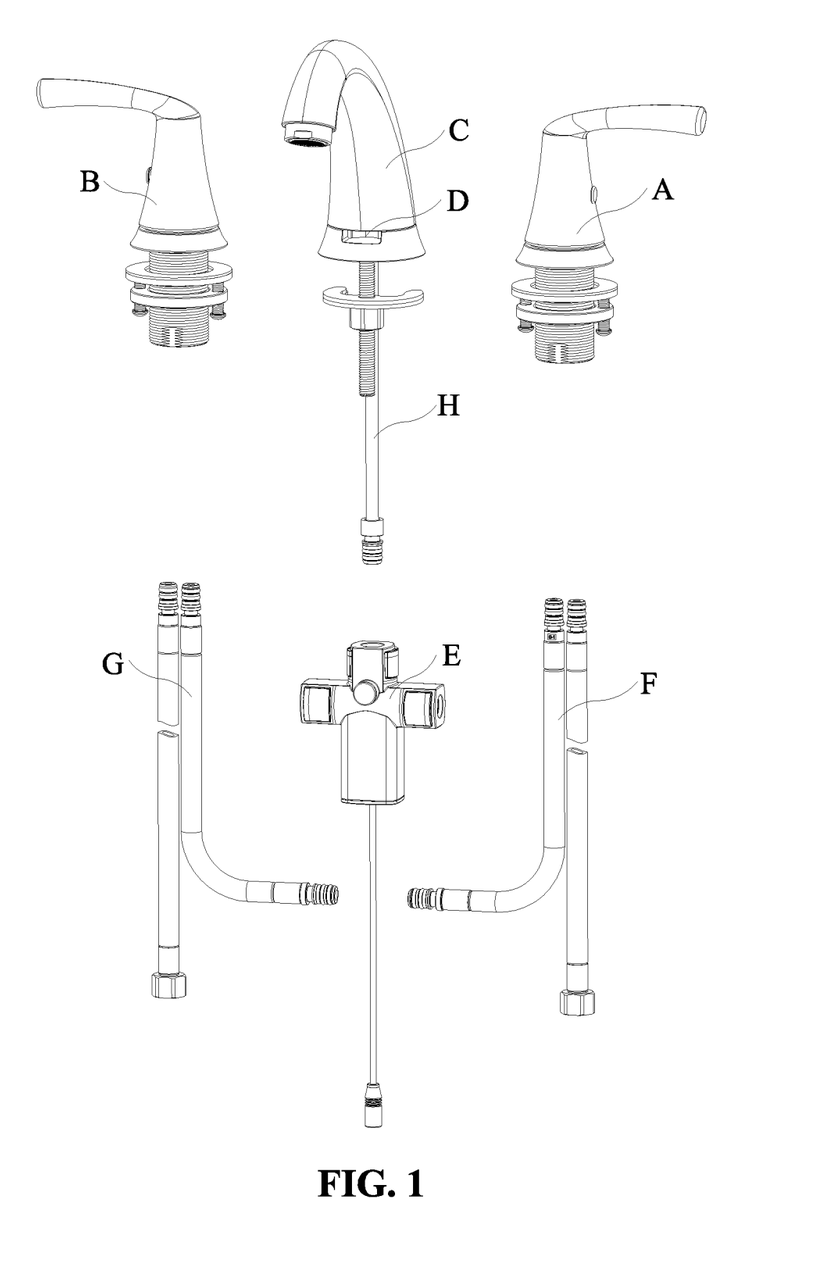
FIG. 1 is an exploded view of the automatic faucet of the present invention.
Figure 2:
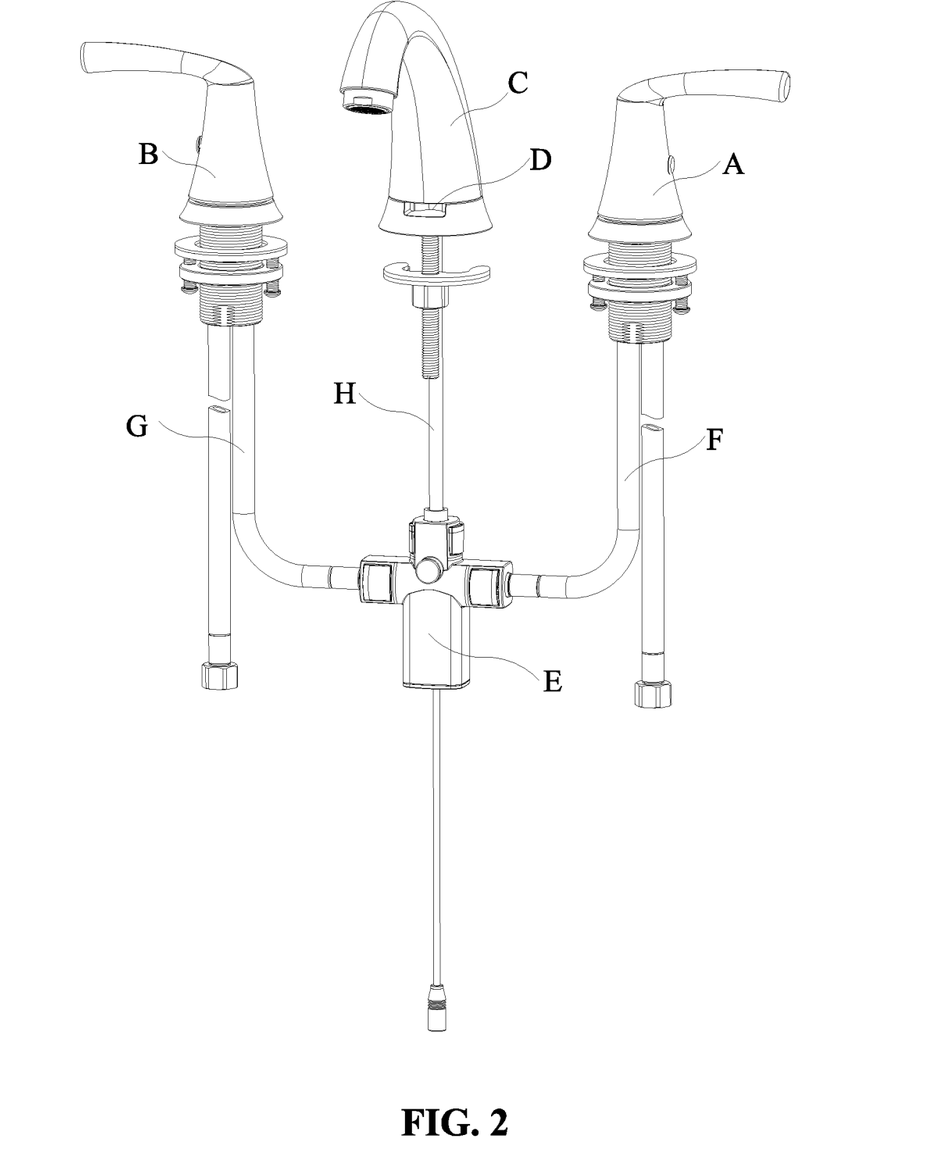
FIG. 2 is a perspective view of the automatic faucet of the present invention.
Figure 3:
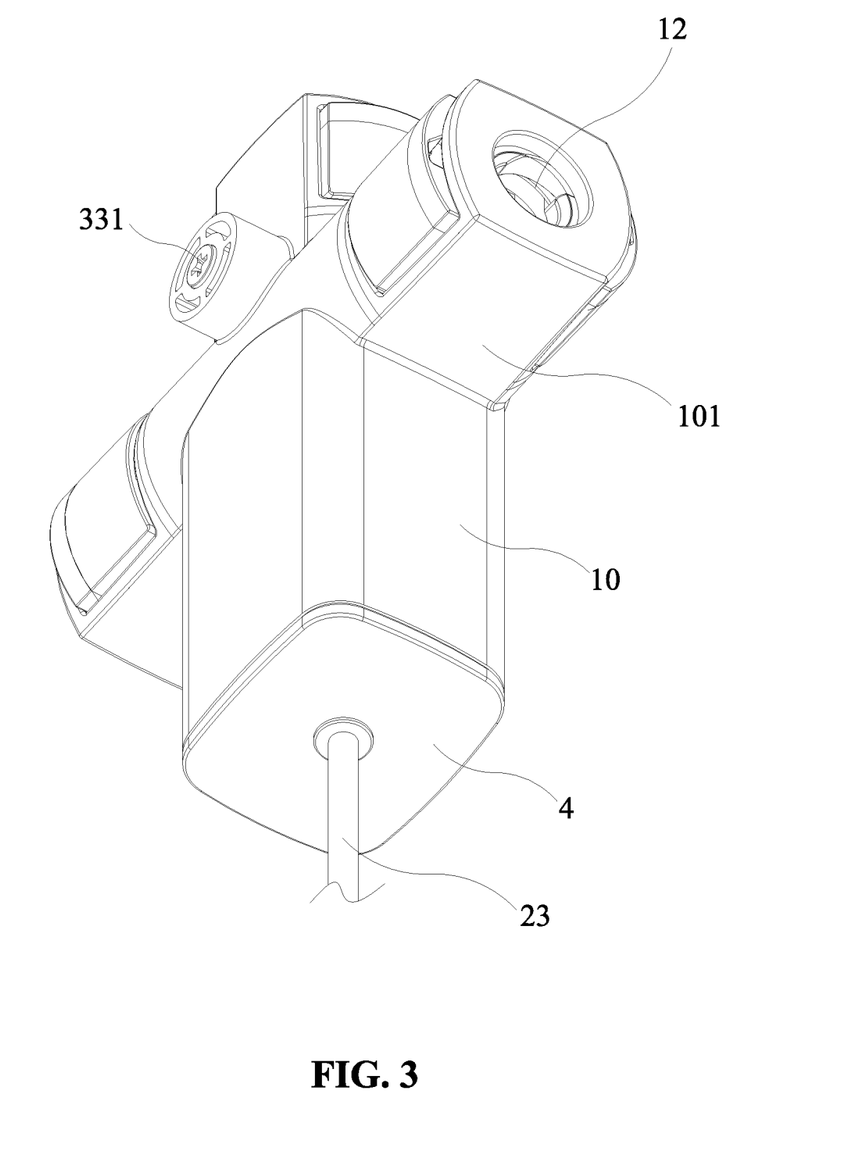
FIG. 3 is a perspective view of the control box of the present invention.
Figure 4:
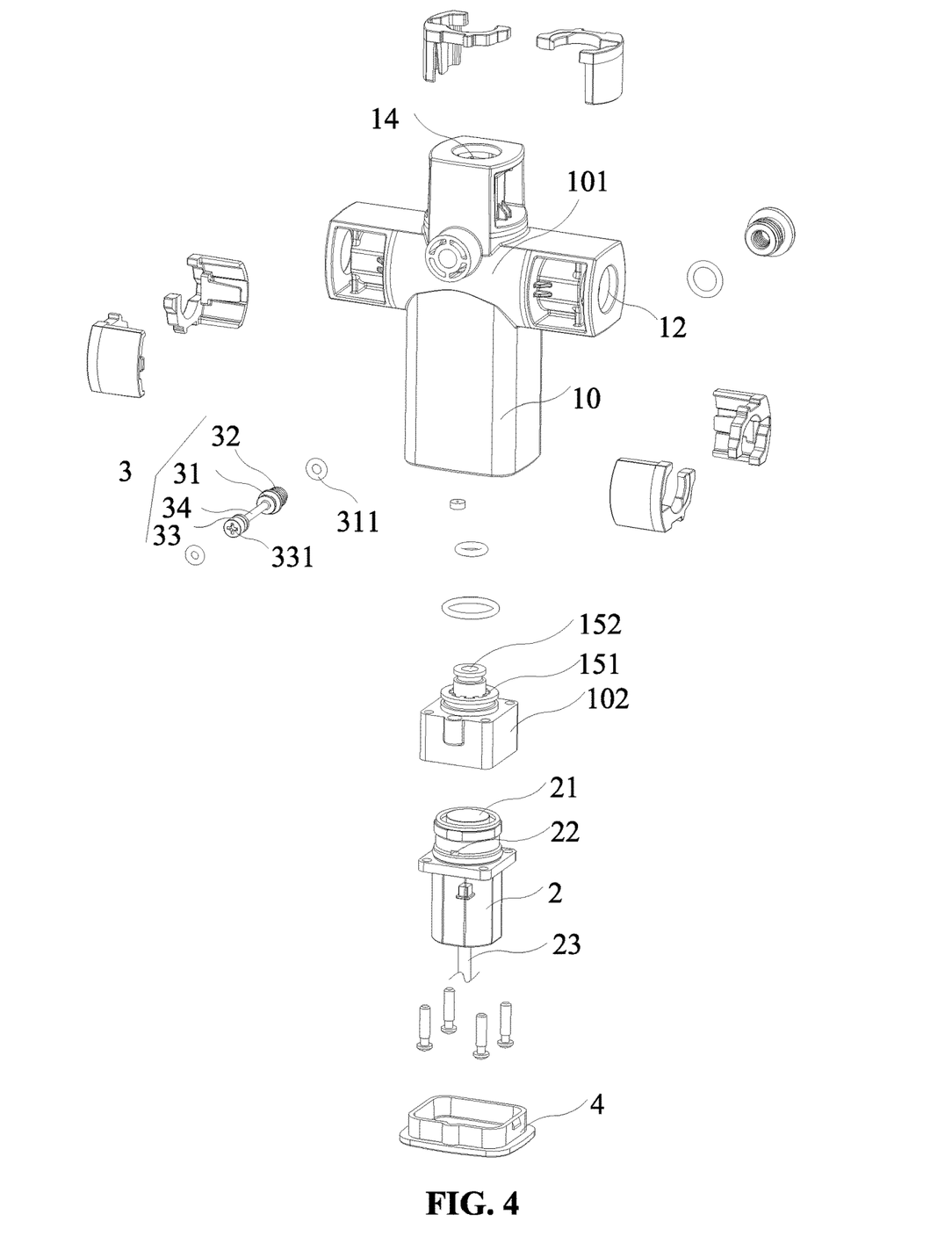
FIG. 4 is an exploded view of the control box of the present invention.
Figure 5:
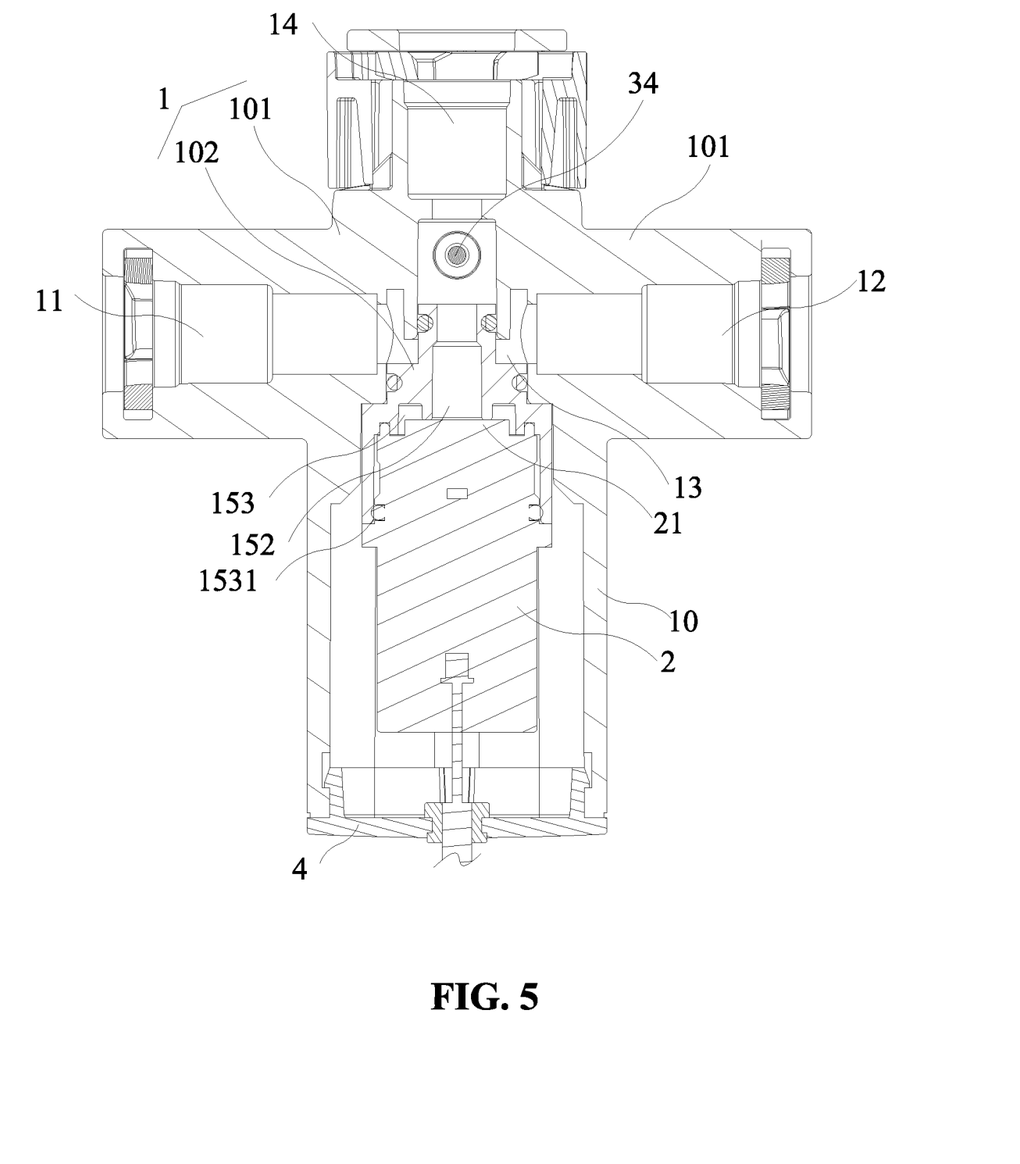
FIG. 5 is a first cross-sectional view of the control box of the present invention.
Figure 6:
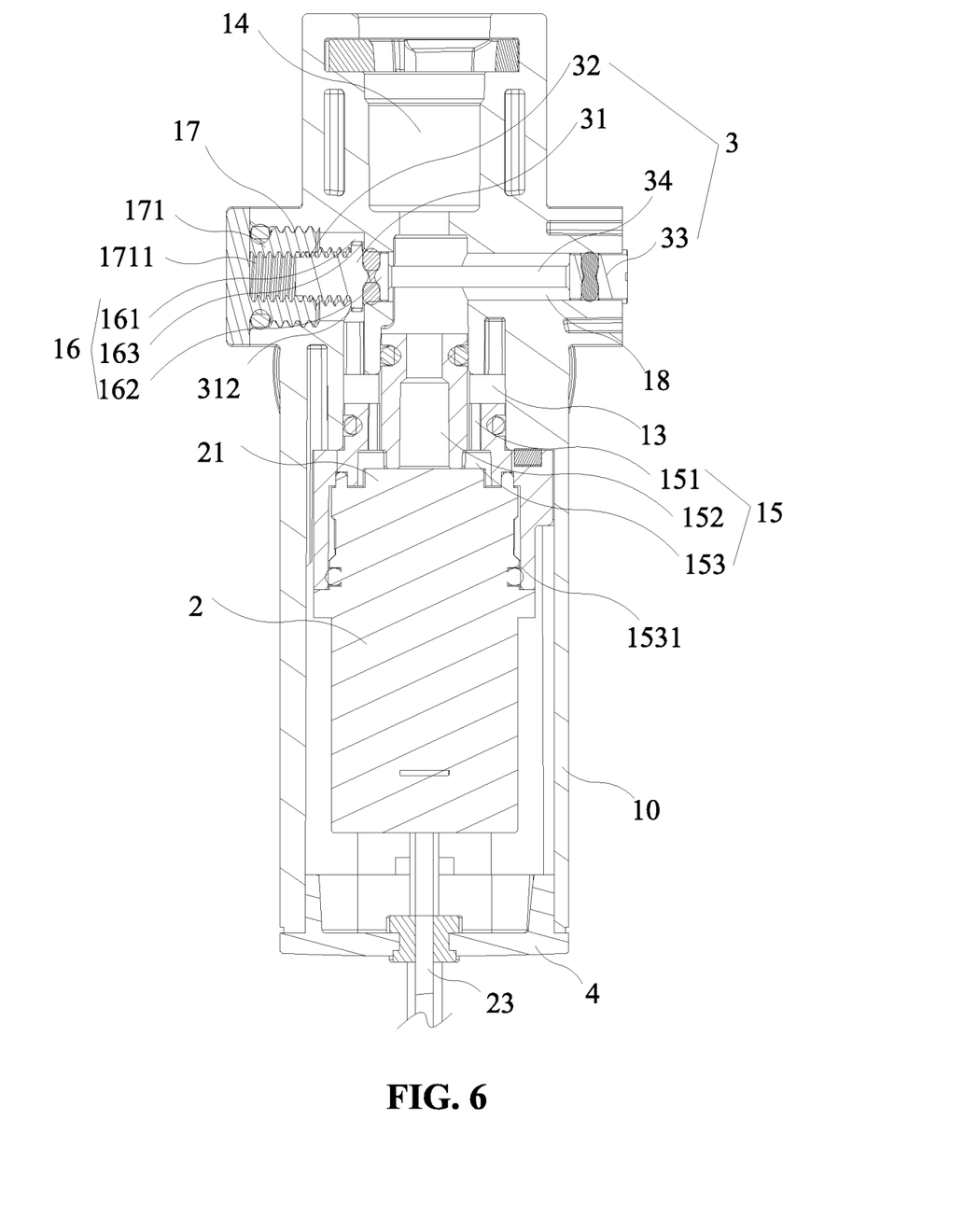
FIG. 6 is a second cross-sectional view of the control box of the present invention, wherein the manual control water passage is closed.
Figure 7:
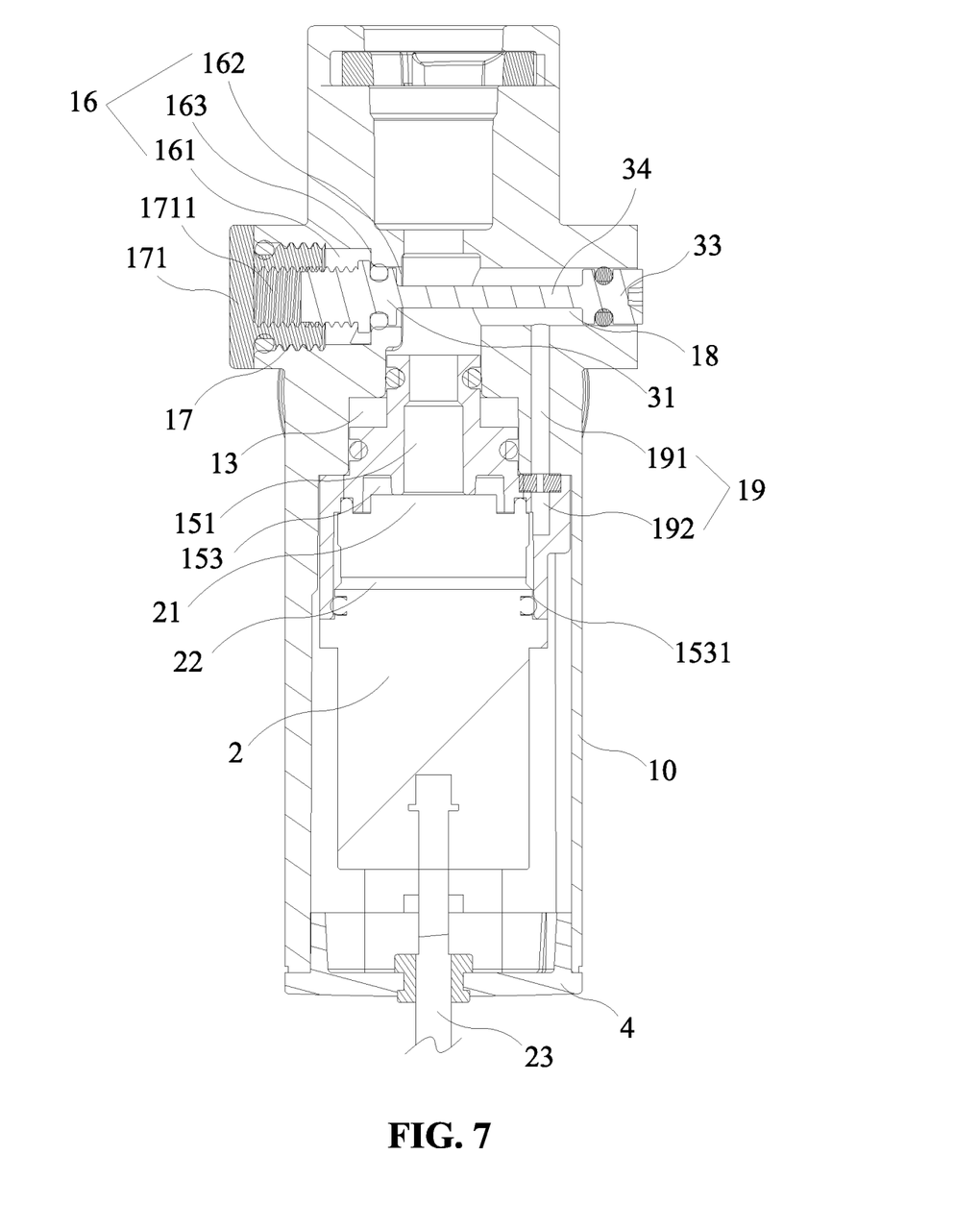
FIG. 7 is a third cross-sectional view of the control box of the present invention, wherein the manual control water passage is closed.
Figure 8:
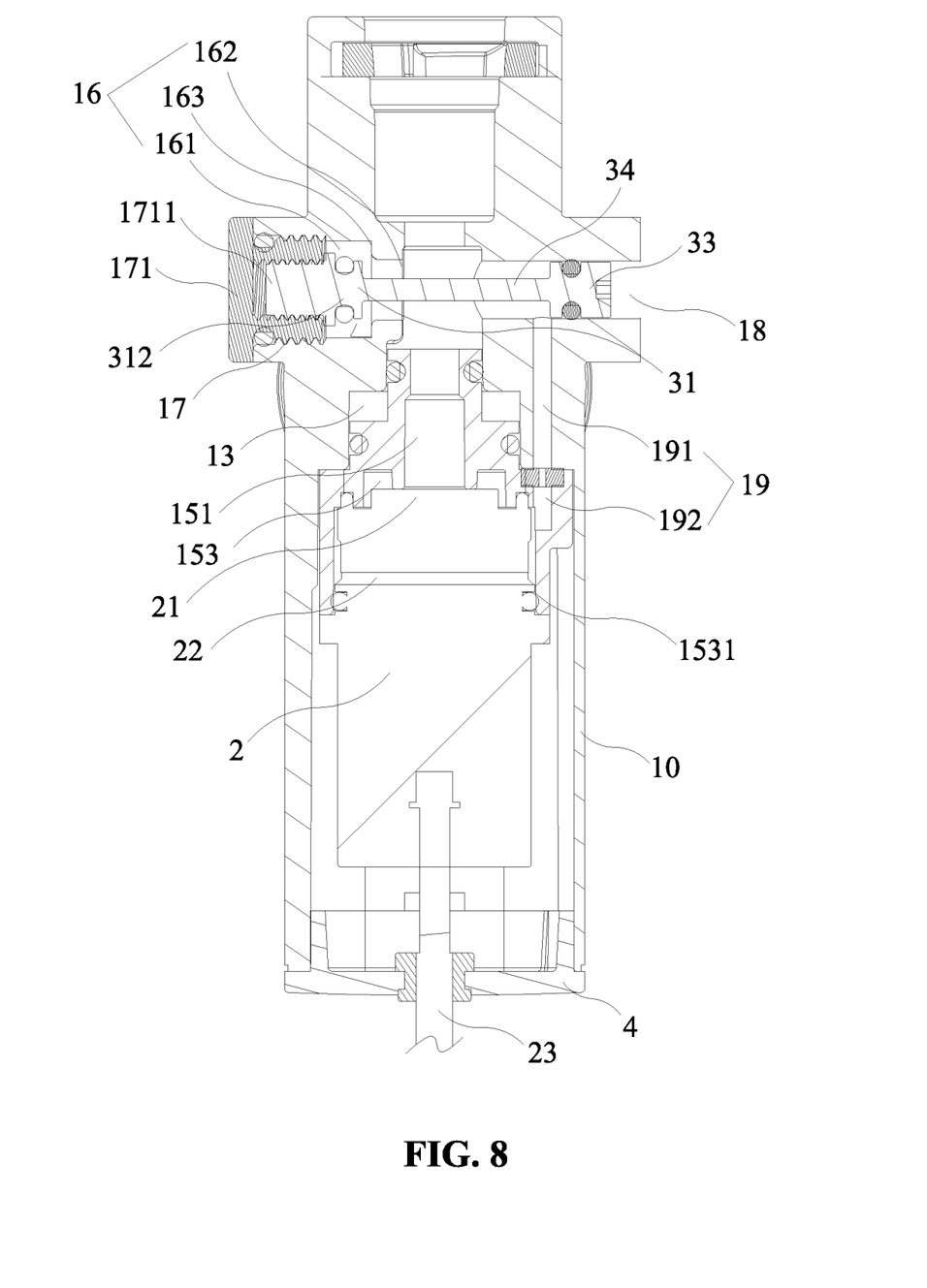
FIG. 8 is a fourth cross-sectional view of the control box of the present invention, wherein the manual control water passage is opened.

Referring to FIG. 1 through FIG. 8, the present invention discloses an automatic faucet for a wash basin. The automatic faucet comprises a cold water valve A, a hot water valve B, a spout C, a sensor D, and a control box E. The cold water valve A, the hot water valve B and the spout C are connected to the control box E, respectively. The sensor D is electrically connected to the control box E. The cold water valve A and the hot water valve B are configured to control whether cold water and hot water are input to the control box E or not. The control box E controls whether to output mixed water to the spout C according to the signal of the sensor D. The sensor D may be an infrared proximity sensor.

Referring to FIG. 1 through FIG. 8, in the present invention, the control box E may include a control box body 1, a solenoid valve 2, and a manual control member 3. The control box body 1 has a cold water inlet 11, a hot water inlet 12, a water-mixing chamber 13, and a mixed water outlet 14. The cold water inlet 11 and the hot water inlet 12 may be arranged opposite to each other. The water-mixing chamber 13 communicates with the cold water inlet 11 and the hot water inlet 12. The water-mixing chamber 13 communicates with the mixed water outlet 14 via a sensor control water passage 15. The water-mixing chamber 13 further communicates with the mixed water outlet 14 via a manual control water passage 16. The solenoid valve 2 is mounted in the control box body 1 and controls opening and closing of the sensor control water passage 15. The manual control member 3 is mounted to the control box body 1 and controls opening and closing of the manual control water passage 16. An outlet end of the cold water valve A is connected to the cold water inlet 11 of the control box E through a cold water pipe F. An outlet end of the hot water valve B is connected to the hot water inlet 12 of the control box E through a hot water pipe G. An inlet end of the spout C is connected to the mixed water outlet 14 of the control box E through a water discharge pipe H. The sensor D is mounted on the spout C and is electrically connected to the solenoid valve 2 of the control box E. The sensor D controls the action of the solenoid valve 2 according to the user's operation, and then controls opening and closing of the sensor control water passage 15, so as to realize a sensor-operated spray function. The user operates the manual control member 3 to control opening and closing of the manual control water passage 16 and further to control whether the water-mixing chamber 13 communicates with the mixed water outlet 14 or not, so as to control the spout C to spray water or not to spray water. In this way, the user can open the manual control water passage 16 when the solenoid valve 2 fails. Then, a manually-operated spray function is realized through the switch control of the cold water valve A and the hot water valve B for use in an emergency.

In the present invention, the manual control member 3 is movably fitted to the control box body 1. The manual control member 3 includes a sealing head 31 extending into the manual control water passage 16. The sealing head 31 is configured to control opening and closing of the manual control water passage 16. In this way, the user can control opening and closing of the manual control water passage 16 by moving the manual control member 3. The manual control water passage 16 includes a manual control inlet 161 and a manual control outlet 162 to communicate with the water-mixing chamber 13 and the mixed water outlet 14, respectively. The manual control inlet 161 communicates with the manual control outlet 162. The diameter of the manual control inlet 161 is greater than that of the manual control outlet 162. A stepped surface 163 is formed at the junction of the manual control inlet 161 and the manual control outlet 162. The manual control member 3 is movably inserted through the manual control inlet 161 and the manual control outlet 162. The sealing head 31 of the manual control member 3 is movable to block the junction of the manual control inlet 161 and the manual control outlet 162 to control opening and closing of the manual control water passage 16. The sealing head 31 may be provided with a sealing ring 311 to ensure that the sealing head 31 can completely block the junction of the manual control inlet 161 and the manual control outlet 162. The sealing ring 311 is in movable contact with the inner wall of the manual control outlet 162. The sealing head 31 has a stop edge 312 that is movable to lean against the stepped surface 163. The cooperation between the stop edge 312 and the stepped surface 163 is configured to restrict the position of the sealing head 31, so that the sealing head 31 can exactly block the junction of the manual control inlet 161 and the manual control outlet 162.

In the present invention, the moving direction of the manual control member 3 is perpendicular to the cold water inlet 11 and the hot water inlet 12. The cold water inlet 11 and the hot water inlet 12 may be arranged on the left and right sides of the control box body 1, respectively. The manual control member 3 is moved in a front-to-back direction. The present invention is arranged in such a way that the manual control member 3 faces the front side (i.e., the user) of the basin for installing the automatic faucet of the present invention. In this way, there is enough space for the user to move the manual control member 3.

In the present invention, the control box body 1 has an internal thread portion 1711. The manual control member 3 has an external thread portion 32 to be threadedly connected to the internal thread portion 171. In this way, the user can move the manual control member 3 by rotating the manual control member 3. The side wall of the control box body 1 is formed with a mounting hole 17 communicating with the manual control inlet 162. The mounting hole 17 is fitted with a mounting head 171 in a sealing manner. The mounting head 171 has the internal thread portion 1711. The internal thread portion 1711 is a threaded countersunk hole so that water will not leak from the internal thread portion 1711. The control box body 1 further has a channel 18 communicating with the mixed water outlet 14. The channel 18 passes through the side wall of the control box body 1. The channel 18 is opposite to the manual control water passage 16. The channel 18 and manual control outlet 162 are located at both sides of the mixed water outlet 14. The manual control member 3 includes an operating head 33 that is movably inserted in the channel 18 to facilitate the user to rotate the manual control member 3. The operating head 33 is connected to the sealing head 31 through a connecting rod 34 passing through the mixed water outlet 14. The operating head 33 is fitted to the channel 18 in a sealing manner to prevent water from leaking from the channel 18. The outer end of the operating head 33 may have an engaging groove 331. The user can rotate the manual control member 3 with a tool (such as a Phillips screwdriver, a flat head screwdriver) matched with the engaging groove 331.

In the present invention, the sensor control water passage 15 includes a sensor control inlet 151, a sensor control outlet 152, and a sensor control water chamber 153 communicating with the sensor control inlet 151 and the sensor control outlet 152. The sensor control inlet 151 communicates with the water-mixing chamber 13. The sensor control outlet 152 communicates with the mixed water outlet 14. The sensor control inlet 151 and the sensor control outlet 152 may be arranged in the same direction. The sensor control water chamber 153 has a fitting hole 1531. The solenoid valve 2 closes the fitting hole 1531 to prevent water from leaking from the fitting hole 1531. The solenoid valve 2 has a valve head 21 extending into the sensor control water chamber 153 to movably block the junction of the sensor control water chamber 153 and the sensor control outlet 152, thereby controlling opening and closing of the sensor control water passage 15. The control box body 1 further has an air passage 19. The air passage 19 communicates with a ventilation passage 22 of the solenoid valve 2 and the channel 18, so that the ventilation passage 22 of the solenoid valve 2 can normally carry out air intake and exhaust.

In the present invention, the control box body 1 includes a protective sleeve fitted onto the solenoid valve 2. The protective sleeve 10 is configured to prevent the solenoid valve 2 from being bumped by foreign objects, thereby protecting the solenoid valve 2. The opening of the protective sleeve 10 may be fitted with a protective cover 4. A connecting wire 23 of the solenoid valve 2 passes through the protective cover 4.

In the present invention, the control box body 1 includes a main body 101 and a base 102 connected to the main body 101. The main body 101 and the base 102 are connected by means of screws. The main body 101 has the cold water inlet 11, the hot water inlet 12, the water-mixing chamber 13, the mixed water outlet 14, the manual control water passage 16, the mounting hole 17, the channel 18, and the protective cover 10. The base 102 has the sensor control water passage 16. In this way, the main body 101 and the base 102 may be formed with the required water passages by injection molding, respectively. The solenoid valve 2 is connected to the base 102. The air passage 19 includes a main body air passage 191 and a base air passage 192 connected to the main body air passage 191. The main body air passage 191 and the base air passage 192 are disposed in the main body 101 and the base 102, respectively.

In the present invention, the connection between the cold water pipe F and the cold water inlet 11 of the control box E, the connection between the hot water pipe G and the hot water inlet 12 of the control box E, and the connection between the water discharge pipe H and the mixed water outlet 14 of the control box E may adopt a quick-installing structure as disclosed in China Patent Publication No. CN203847873U.

Although particular embodiments of the present invention have been described in detail for purposes of illustration, various modifications and enhancements may be made without departing from the spirit and scope of the present invention. Accordingly, the present invention is not to be limited except as by the appended claims

What is claimed is:

1. An automatic faucet for a wash basin, comprising a cold water valve, a hot water valve, a spout, a sensor, and a control box;

the control box including a control box body, a solenoid valve, and a manual control member; the control box body having a cold water inlet, a hot water inlet, a water-mixing chamber, and a mixed water outlet; the water-mixing chamber communicating with the cold water inlet and the hot water inlet, the water-mixing chamber communicating with the mixed water outlet via a sensor control water passage, the water-mixing chamber further communicating with the mixed water outlet via a manual control water passage; the solenoid valve being mounted in the control box body and controlling opening and closing of the sensor control water passage; the manual control member being movably fitted to the control box body and controlling opening and closing of the manual control water passage;

an outlet end of the cold water valve being connected to the cold water inlet of the control box through a cold water pipe; an outlet end of the hot water valve being connected to the hot water inlet of the control box through a hot water pipe; an inlet end of the spout being connected to the mixed water outlet of the control box through a water discharge pipe; the sensor being mounted on the spout and being electrically connected to the solenoid valve of the control box.

2. The automatic faucet as claimed in claim 1, wherein the manual control member includes a sealing head extending into the manual control water passage, and the sealing head is configured to control opening and closing of the manual control water passage.

3. The automatic faucet as claimed in claim 2, wherein the manual control water passage includes a manual control inlet and a manual control outlet to communicate with the water-mixing chamber and the mixed water outlet respectively, the manual control inlet communicates with the manual control outlet, the manual control inlet has a diameter greater than that of the manual control outlet, a stepped surface is formed at a junction of the manual control inlet and the manual control outlet;

the manual control member is movably inserted through the manual control inlet and the manual control outlet, and the sealing head of the manual control member is movable to block the junction of the manual control inlet and the manual control outlet to control opening and closing of the manual control water passage.

4. The automatic faucet as claimed in claim 3, wherein the sealing head has a stop edge that is movable to lean against the stepped surface.

5. The automatic faucet as claimed in claim 3, wherein the control box body has an internal thread portion, and the manual control member has an external thread portion to be threadedly connected to the internal thread portion.

6. The automatic faucet as claimed in claim 5, wherein a side wall of the control box body is formed with a mounting hole communicating with the manual control inlet, the mounting hole is fitted with a mounting head in a sealing manner, the mounting head has the internal thread portion, and the internal thread portion is a threaded countersunk hole.

7. The automatic faucet as claimed in claim 3, wherein the control box body further has a channel communicating with the mixed water outlet, the channel passes through a side wall of the control box body, the channel is opposite to the manual control water passage, the channel and the manual control outlet are located at both sides of the mixed water outlet;

the manual control member includes an operating head that is movably inserted in the channel, the operating head is connected to the sealing head through a connecting rod passing through the mixed water outlet, and the operating head is fitted to the channel in a sealing manner.

8. The automatic faucet as claimed in claim 1, wherein the sensor control water passage includes a sensor control inlet, a sensor control outlet, and a sensor control water chamber communicating with the sensor control inlet and the sensor control outlet; the sensor control inlet communicates with the water-mixing chamber, the sensor control outlet communicates with the mixed water outlet, the sensor control water chamber has a fitting hole;

the solenoid valve closes the fitting hole, the solenoid valve has a valve head extending into the sensor control water chamber to movably block a junction of the sensor control water chamber and the sensor control outlet.

9. The automatic faucet as claimed in claim 8, wherein the control box body includes a main body and a base connected to the main body, the main body has the cold water inlet, the hot water inlet, the water-mixing chamber, the mixed water outlet and the manual control water passage, the base has the sensor control water passage, and the solenoid valve is connected to the base.

10. The automatic faucet as claimed in claim 1, wherein the control box body includes a protective sleeve fitted onto the solenoid valve.

11. The automatic faucet as claimed in claim 1, wherein a moving direction of the manual control member is perpendicular to the cold water inlet and the hot water inlet.

\* \* \* \* \*